(12) United States Patent
Oka et al.

(10) Patent No.: US 7,475,753 B2
(45) Date of Patent: Jan. 13, 2009

(54) DRIVE CONTROL APPARATUS FOR FORKLIFT

(75) Inventors: Hidenori Oka, Kariya (JP); Tadashi Yamada, Kariya (JP); Toshikazu Kamiya, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 308 days.

(21) Appl. No.: 11/541,183

(22) Filed: Sep. 29, 2006

(65) Prior Publication Data

US 2008/0011530 A1 Jan. 17, 2008

(30) Foreign Application Priority Data

Sep. 30, 2005 (JP) .............................. 2005-288243

(51) Int. Cl.
*B60L 8/00* (2006.01)
(52) U.S. Cl. ...................... 180/306; 180/282; 180/54.1; 187/224
(58) Field of Classification Search ................ 180/54.1, 180/282, 305, 306, 307, 367; 187/222, 223, 187/224, 233
See application file for complete search history.

(56) References Cited

U.S. PATENT DOCUMENTS

| 5,947,516 | A | * | 9/1999 | Ishikawa | ..................... 280/755 |
| 6,138,795 | A | * | 10/2000 | Kamiya | ...................... 187/223 |
| 6,164,415 | A | * | 12/2000 | Takeuchi et al. | ............. 187/224 |
| 6,554,084 | B1 | * | 4/2003 | Enmeiji | ..................... 180/6.24 |
| 7,278,508 | B2 | * | 10/2007 | Nakada et al. | .............. 180/305 |
| 7,366,600 | B2 | * | 4/2008 | Osaki et al. | .................... 701/50 |

FOREIGN PATENT DOCUMENTS

| JP | 2000-179372 | 6/2000 |
| JP | 2001-31391 | 2/2001 |

* cited by examiner

*Primary Examiner*—Christopher P Ellis
*Assistant Examiner*—Brian Swenson
(74) *Attorney, Agent, or Firm*—Morgan & Finnegan, LLP

(57) ABSTRACT

When a determination result of a limitation determining section during a driving of a forklift is positive, a control section limits a vehicle speed and adjusts an engine speed. If a limitation canceling condition is met while the vehicle speed is limited, a control section cancels a vehicle speed limitation state, and executes a loading priority control in which an actuation of a loading device is prioritized. Thus, when a loading device is actuated during driving with a speed limit, the stability of the forklift is ensured while improving the workability of the loading operation.

6 Claims, 6 Drawing Sheets

DRIVE CONTROL APPARATUS FOR FORKLIFT

BACKGROUND OF THE INVENTION

The present invention relates to a drive control apparatus for controlling driving of a forklift.

Conventionally, forklifts are widely used as industrial vehicles for handling loads (picking up and placing of loads) in plants. Due to its characteristic usage, the driving stability of this type of forklift greatly varies depending on the load state. For example, the center of gravity of the vehicle is shifted and the driving stability varies between a state of carrying no loads and a state of carrying a load. When carrying a load, the driving stability varies depending on the weight of the load, the height of the fork on which the load is mounted, the tilt angle of the fork. Thus, conventionally, a technique for limiting the driving of a forklift to improve the driving stability of the vehicle is disclosed in Japanese Laid-Open Patent Publication Nos. 2001-31391 and 2000-179372. The technique disclosed in the publication No. 2001-31391 limits the vehicle speed in accordance with the load state of the forklift, so that the forklift always travels at an optimum safety speed. The publication No. 2000-179372 discloses an outdoor driving mode and an indoor driving mode. A speed limit is set for each of the outdoor and indoor driving modes, thereby limiting increase of the engine speed.

As described above, forklifts are industrial vehicles performing loading operations. In the case where the vehicle driving force is derived from the engine, most forklifts uses the power of the engine for actuating loading device as well as for driving the vehicle. Thus, since increase of the engine speed is suppressed so that the vehicle speed does not exceed the speed limit in a forklift that limits the driving of the vehicle (vehicle speed), loading operation (actuation of the loading device) needs to be performed with a lowered engine power while the speed is limited, which can degrade the efficiency of the loading operation. In this respect, the technique disclosed in the publication No. 2000-179372 cancels the limitation on the driving during the loading operation, thereby preventing the efficiency of the loading operation from being degraded. More specifically, in the publication No. 2000-179372, the driving mode with the speed limit is cancelled when an operation of a loading operation lever is detected, and is switched to a mode prioritizing the loading operation.

In the publication No. 2000-179372, the limitation on the driving is cancelled based only on the operation state of the loading operation lever. When the driver manipulates the loading operation lever in preparation for a loading operation, the limitation on the driving is cancelled. The cancellation of the limitation causes the engine speed to be increased in accordance with depression of the accelerator pedal. Therefore, the stability of the vehicle can be degraded by a sudden acceleration.

SUMMARY OF THE INVENTION

Accordingly, it is an objective of the present invention to provide a drive control apparatus for a forklift that, in the case where a loading device is actuated during driving with a speed limit, ensures the stability of the vehicle while improving the workability of the loading operation.

To achieve the foregoing objectives and in accordance with one aspect of the present invention, a drive control apparatus for a forklift is provided. The forklift includes a vehicle, a drive wheel provided to the vehicle, an engine, a power transmission mechanism capable of transmitting power of the engine to the drive wheel, a loading device that is provided at a front portion of the vehicle and mounts a load, and a loading pump that supplies hydraulic oil to actuate the loading device. The forklift uses the power of the engine as a driving force for driving the vehicle and as a loading force for actuating the loading pump. The drive control apparatus includes a disconnection detection section, an acceleration operation section, a limitation determining section, and a control section. The disconnection detection section detects whether the power transmission mechanism is in a disconnection state, in which the driving force is not transmitted to the drive wheel. When at least the disconnection detection section detects the disconnection state, a limitation canceling condition is met. The acceleration operation section instructs acceleration of the vehicle in response to an operation by a driver. The limitation determining section determines whether to limit a maximum vehicle speed during driving of the vehicle based on a determination of a load state or an input from an instruction section that instructs driving limitation. When the result of the determination is positive, the limitation determining section determines a speed limit. The control section adjusts a speed of the engine based on the amount of operation of the acceleration operation section, and controls the driving of the vehicle. When the determination result of the limitation determining section during the driving of the vehicle is negative, the control section adjusts the engine speed in accordance with the operation amount of the acceleration operation section without limiting the vehicle speed. When the determination result of the limitation determining section during the traveling of the vehicle is positive, the control section limits the vehicle speed and adjusts the engine speed such that the vehicle speed does not exceed the speed limit. If the limitation canceling condition is met while the vehicle speed is limited, the control section cancels the vehicle speed limitation state, and executes a loading priority control in which the actuation of the loading device is prioritized. In the loading priority control, the control section adjusts the engine speed in accordance with the operation amount of the acceleration operation section.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A drive control apparatus CD for use in a forklift 10 according to a first embodiment of the present invention will now be described with reference to FIGS. 1 to 9. In the following, the direction in which a driver of the forklift 10 is defined as a forward direction. The backward, upward, downward, leftward, and rightward directions are defined with reference to the forward direction.

Figure 1:
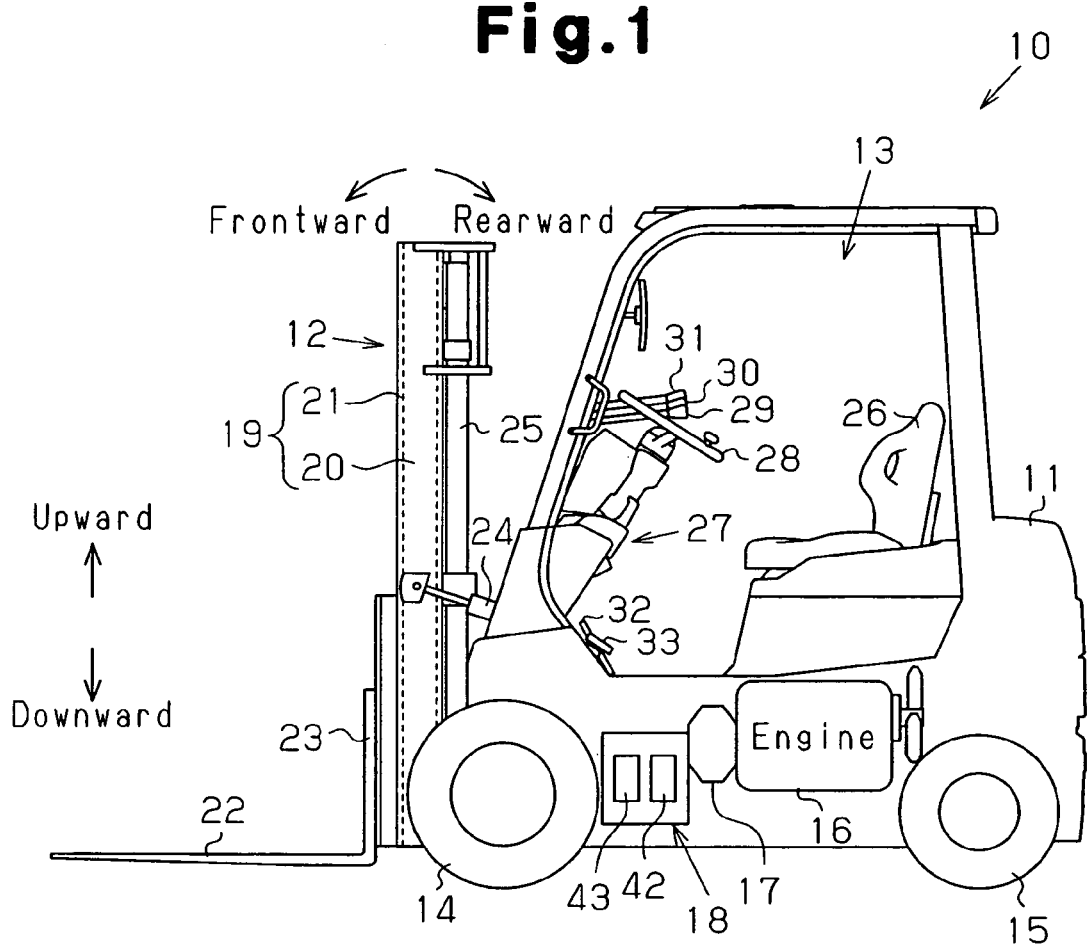
FIG. 1 is a side view illustrating a forklift.

FIG. 1 is a side view of the forklift 10. As shown in FIG. 1, the forklift 10 includes a loading device 12 at a front portion of a vehicle body 11. A cab 13 is formed in a center portion of the vehicle body 11. Drive wheels (front wheels) 14 are located in front and lower portions of the vehicle body 11, and steered wheels 15 are provided in rear and lower portions of the vehicle body 11. The vehicle body 11 also mounts a transmission 18 having a torque converter 17. The torque converter 17 forms a power transmission mechanism. An engine 16 is coupled to the drive wheels 14 by way of the transmission 18 having the torque converter 17. The transmission 18 is located between the drive wheels 14 and the engine 16. The forklift 10 of this embodiment is an engine type (engine vehicle), in which the drive wheels 14 are driven by the engine 16. That is, the forklift 10 travels by using the power of the engine 16.

The loading device 12 will now be described. A multistage (two-stage in this embodiment) mast assembly 19 is provided at a front portion of the vehicle body 11. The mast assembly 19 includes a pair of left and right outer masts 20 and a pair of left and right inner masts 21. A pair of left and right forks 22 are attached to the mast assembly 19 by means of a lift bracket 23. A hydraulic tilt cylinder 24 is coupled to each outer mast 20 to tilt the mast assembly 19 (the forks 22) frontward and rearward of the vehicle body 11. A hydraulic lift cylinder 25 is coupled to each inner mast 21. The lift cylinders 25 lift and lower the forks 22 with respect to the vehicle body.

A driver's seat 26, on which a driver is seated, is provided in the cab 13. Also, an instrument panel 27 is provided in a front portion of the cab 13. On the instrument panel 27, steering wheel 28, a lift lever 29, a tilt lever 30, and an advance/reverse lever (direction lever) 31 are provided. The steering wheel 28 is used for changing the steered angle of the steered wheels 15. The lift lever 29 is operated for lifting or lowering the forks 22, and the tilt lever 30 is operated for tilting the mast assembly 19. When the lift lever 29 is operated, the lift cylinders 25 are actuated in accordance with the direction of the operation (lifting direction or lowering direction), so that the inner masts 21 are slid along the outer masts 20. Accordingly, the forks 22 are lifted or lowered. When the tilt lever 30 is operated, the tilt cylinders 24 are actuated (extended or retracted) in accordance with the direction of the operation (forward tilting direction or rearward tilting direction), so that the mast assembly 19 is tilted with the forks 22. The advance/reverse lever 31 is operated for instructing the traveling direction of the vehicle (in this embodiment, advancing direction or reversing direction).

Figure 3:
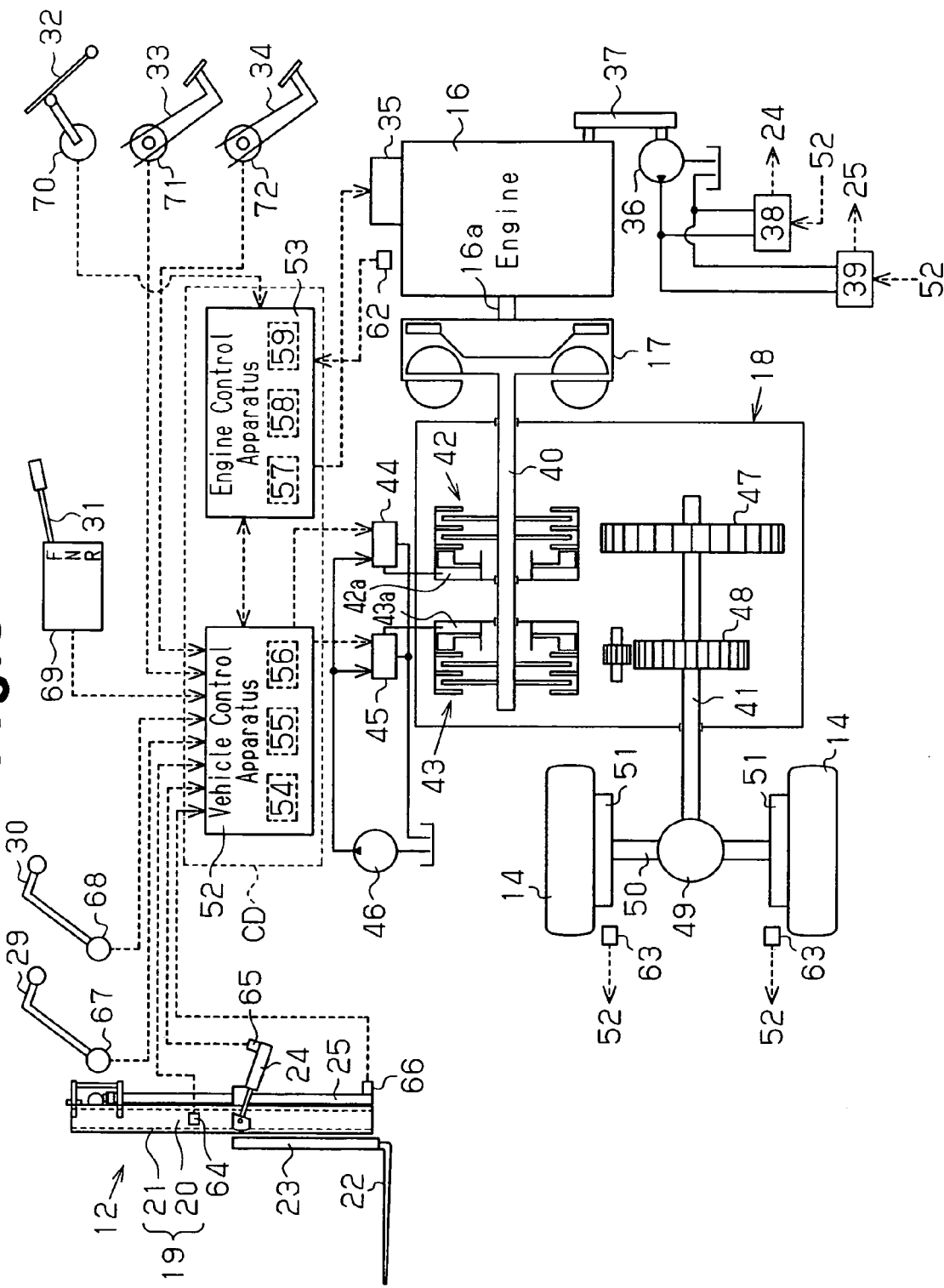
FIG. 3 is a diagrammatic view showing the forklift.

On the floor of the cab 13, an acceleration section, which is an accelerator pedal 32, an inching pedal (an inching operation section) 33, and a brake pedal 34 (a braking operation section), are provided. FIG. 1 shows the accelerator pedal 32 and the inching pedal 33. FIG. 3 shows the brake pedal 34. The accelerator pedal 32 is operated for instructing acceleration (driving) of the vehicle. The inching pedal 33 is operated for partially engaging the clutches of the transmission 18 (an advancing clutch 42 and a reversing clutch 43) when manually operating the vehicle to slowly travel during loading. The engagement state of the clutches (the advancing clutch 42 and the reversing clutch 43) is continuously changed between engagement and disengagement by means of the inching pedal 33. The brake pedal 34 is operated for applying braking force to the vehicle. When operated, the brake pedal 34 is operated independently from the inching pedal 33. On the other hand, when operated over halfway, the inching pedal 33 starts being interlocked with the brake pedal 34. That is, the inching pedal 33 is operated independently from the brake pedal 34 (non-interlocking) in an inching region, and interlocked with the brake pedal 34 outside of the inching region (braking region). The inching region refers to a region in which the inching pedal 33 is depressed and the clutch (the advancing clutch 42 or the reversing clutch 43) is partially engaged. The braking region is a region in which braking force is applied to the vehicle.

FIG. 3 is a diagrammatic view showing the forklift 10 of the present embodiment.

An output shaft 16a of the engine 16 is coupled to the transmission 18 with the torque converter 17. The engine 16 is provided with a throttle actuator 35. The throttle actuator 35 is actuated to adjust the opening degree of a throttle valve. Accordingly, the speed of the engine 16, that is, the speed of the output shaft 16a, is adjusted. The engine 16 is also connected to a loading pump, which is a hydraulic pump 36, with a speed increasing gear 37. The hydraulic pump 36 is driven by the engine 16. In the forklift 10 of the present embodiment, the power of the engine 16 is used for traveling the vehicle and for actuating the loading device 12 (the tilt cylinders 24 and the lift cylinders 25). The discharge side of the hydraulic pump 36 is connected to the tilt cylinders 24 for tilting the mast assembly 19 (the forks 22) and the lift cylinders 25 for lifting and lowering the forks 22. The tilt cylinders 24 are connected to the hydraulic pump 36 with pipes and a fork tilting electromagnetic control valve 38, while the lift cylinders 25 are connected to the hydraulic pump with pipes and a fork lifting/lowering electromagnetic control valve 39.

The transmission 18 has an input shaft (main shaft) 40 and an output shaft (counter shaft) 41. The input shaft 40 is connected to the advancing clutch 42 and the reversing clutch 43. The advancing clutch 42 and the reversing clutch 43 are hydraulic clutches (in this embodiment, wet multi-disc clutches). The advancing clutch 42 and the reversing clutch 43 have a pressure receiving chamber 42a, 43a, respectively. The engagement force of each clutch 42, 43 is adjusted by the hydraulic pressure in the corresponding pressure receiving chamber 42a, 43a (hereinafter, referred to as clutch pressure). When the clutch pressure is increased, the engagement force is reduced.

The advancing clutch 42 is connected to an advancing electromagnetic valve 44, and the reversing clutch 43 is connected to a reversing electromagnetic valve 45. The electromagnetic valves 44, 45 are connected to a hydraulic pump 46 with pipes. The hydraulic pump 46 is driven by the rotational force transmitted to the transmission 18 when the engine 16 is running (rotational force of the input shaft 40 of the transmission 18). The pressure receiving chamber 42a of the advancing clutch 42 is supplied with hydraulic oil through the advancing electromagnetic valve 44 by the actuation of the hydraulic pump 46. Likewise, the pressure receiving chamber 43a of the reversing clutch 43 is supplied with hydraulic oil through the reversing electromagnetic valve 45 by the actuation of the hydraulic pump 46. In this embodiment, the advancing electromagnetic valve 44 and the reversing electromagnetic valve 45 are fully open when the current to the solenoid is zero, and are fully closed when a current is supplied to the solenoid. When currents to the solenoids of the electromagnetic valves 44, 45 become zero, hydraulic oil is supplied to the pressure receiving chambers 42a, 43a, and the advancing clutch 42 and the reversing clutch 43 are disengaged. When currents are supplied to the solenoids of the electromagnetic valves 44, 45, no hydraulic oil is supplied to the pressure receiving chambers 42a, 43a, and the advancing clutch 42 and the reversing clutch 43 are engaged.

An advance gear train 47 and a reverse gear train 48 are attached to the output shaft 41 of the transmission 18. The gear trains 47, 48 transmit rotation of the input shaft 40 to the output shaft 41. The output shaft 41 of the transmission 18 is coupled to an axle 50 with a differential 49. The drive wheels 14 are proved at ends of the axle 50. The power of the engine 16 is transmitted to the axle 50 through the output shaft 41 of the transmission 18, and the drive wheels 14 are rotated in a direction corresponding to the rotating direction of the output shaft 41. A hydraulic drum brake 51 is provided at each drive wheel 14.

Although the torque converter 17, the transmission 18, the advancing electromagnetic valve 44, the reversing electromagnetic valve 45, the hydraulic pump 46 are each depicted independently in FIG. 3, these components are accommodated in a single housing.

The vehicle body 11 mounts a vehicle control apparatus 52 and an engine control apparatus 53. In this embodiment, the vehicle control apparatus 52 and the engine control apparatus 53 form the drive control apparatus CD (depicted by a broken line in FIG. 3) for controlling the driving of the forklift 10. The vehicle control apparatus 52 and the engine control apparatus 53 are connected to each other such that electrical signals can be sent between the apparatuses 52, 53. The vehicle control apparatus 52 and the engine control apparatus 53 may be connected with wires or wirelessly connected. The vehicle control apparatus 52 has a central processing unit (CPU) 54 for controlling the vehicle, a random access memory 55 for controlling the vehicle, and an input-output interface 56. The memory 55 stores control programs for controlling driving and loading of the forklift 10. The memory 55 also stores map data for controlling driving and loading of the forklift 10 (shown in FIGS. 4, 5, and 6). The engine control apparatus 53 has a central processing unit (CPU) 57 for controlling the engine 16, a random access memory 58 for controlling the engine 16, and an input-output interface 59. The memory 58 stores control programs for controlling the engine 16. The memory 58 also stores map data for controlling the engine 16 (shown in FIG. 7). The vehicle control apparatus 52 inputs detection signals from various types of sensors and various types of signals from the engine control apparatus 53, and controls the driving and loading of the forklift 10. The engine control apparatus 53 inputs detection signals from various types of sensors and various types of signals from the vehicle control apparatus 52, and controls the engine 16.

Figure 2:
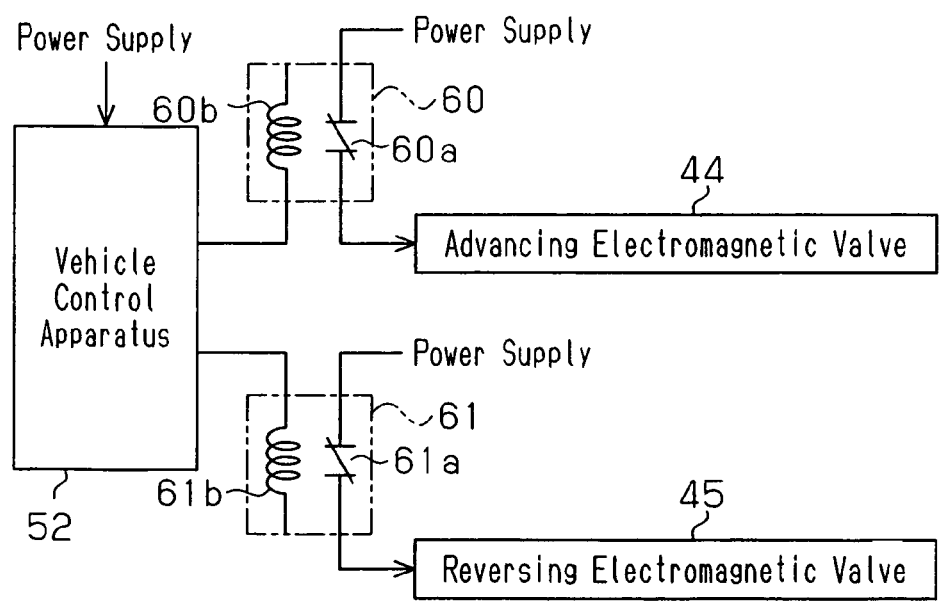
FIG. 2 is a diagram showing a relay circuit for advancing and relay circuit for reversing, which are located between a vehicle control apparatus and an electromagnetic valve for advancing and between the vehicle control apparatus and an electromagnetic valve for reversing, respectively.

The vehicle control apparatus 52 is connected to the advancing electromagnetic valve 44 through an advancing relay circuit 60 as shown in FIG. 2, and to the reversing electromagnetic valve 45 through a reversing relay circuit 61. The advancing relay circuit 60 is formed by an advancing normally-closed contact (contact b) 60a and an advancing relay coil (electromagnet) 60b. The advancing electromagnetic valve 44 is energized by demagnetizing the advancing relay coil 60b and closing the advancing normally-closed contact 60a. The reversing relay circuit 61 is formed by a reversing normally-closed contact (contact b) 61a and a reversing relay coil (electromagnet) 61b. The reversing electromagnetic valve 45 is energized by demagnetizing the reversing relay coil 61b and closing the reversing normally-closed contact 61a.

Hereafter, various sensors mounted on the forklift 10 and connection of the sensors (to what the sensors are connected) will be described.

An engine speed sensor 62 for detecting the speed of the engine 16 is provided at the engine 16. The engine speed sensor 62 is connected to the engine control apparatus 53 and outputs a detection signal (engine speed signal) corresponding to the engine speed. Detection signals of the engine speed sensors 62 are outputted to the vehicle control apparatus 52 via the engine control apparatus 53. Vehicle speed sensors 63 for detecting the vehicle speed of the forklift 10 are provided at positions of the vehicle body 11 that correspond to the drive wheels 14. The vehicle speed sensors 63 are connected to the vehicle control apparatus 52 and each output a detection signal (vehicle speed signal) corresponding to the vehicle speed. Detection signals of the vehicle speed sensors 63 are outputted to the engine control apparatus 53 via the vehicle control apparatus 52.

A height sensor 64 for detecting the height of the forks 22 is provided in the mast assembly 19. The height sensor 64 is connected to the vehicle control apparatus 52. When the forks 22 reach a predetermined height H (for example, 2200 mm), the height sensor 64 outputs a detection signal (height signal). The height sensor 64 is formed, for example, by a limit switch. In this embodiment, the single height sensor 64 is provided in the mast assembly 19. A range equal to or higher than the height H detected by the height sensor 64 is defined as a high height range, and a range lower than the height H is defined as a low height range.

A tilt angle sensor 65 for detecting the tilt angle is attached to one of the tilt cylinders 24. The tilt angle sensor 65 is connected to the vehicle control apparatus 52 and detects an inclination angle of the forks 22 with respect to the angle of the forks 22 at a horizontal position (horizontal angle). The tilt angle sensor 65 outputs a detection signal (tilt angle signal) that corresponds to the inclination angle. The tilt angle sensor 65 is formed, for example, by a potentiometer. A load weight sensor 66 for detecting the weight of a load on the forks 22 is attached to one of the lift cylinders 25. The load weight sensor 66 is connected to the vehicle control apparatus 52 and detects the hydraulic pressure in the lift cylinder 25. The load weight sensor 66 outputs a detection signal (load signal) that corresponds to the weight of the load on the forks 22. The load weight sensor 66 is formed, for example, by a pressure sensor.

A lift lever sensor 67 for detecting the moved amount of the lift lever 29 is attached to the lift lever 29. A tilt lever sensor 68 for detecting the moved amount of the tilt lever 30 is attached to the tilt lever 30. The lift lever sensor 67 and the tilt lever sensor 68 are connected to the vehicle control apparatus 52, and output detection signals (lift manipulation signal and tilt manipulation signal) that correspond to the moved amounts of the lift lever 29 and the tilt lever 30. A shift switch 69 for detecting the position of the advance/reverse lever 31 (advance position [F], neutral position [N], reverse position [R]) is attached to the advance/reverse lever 31. The shift switch 69 is connected to the vehicle control apparatus 52 and outputs a detection signal (advance/reverse signal) that corresponds to the position of the advance/reverse lever 31. In this embodiment, when the advance/reverse lever 31 is at the advance position [F] or the reverse position [R], the shift switch 69 outputs a signal corresponding to the position. When the advance/reverse lever 31 is at the neutral position [N], the shift switch 69 outputs no detection signal. That is, the CPU 54 of the vehicle control apparatus 52 receives a detection signal from the shift switch 69 to determine that the advance/reverse lever 31 is at the advance position [F] or the reverse position [R]. When receiving no detection signal, the CPU 54 determines that the advance/reverse lever 31 is at the neutral position [N].

An accelerator pedal position sensor 70 is provided at the accelerator pedal 32 to detect the depressed amount of the accelerator pedal 32. The accelerator pedal position sensor 70 is connected to the engine control apparatus 53 and outputs a detection signal (pedal depressed amount signal) corresponding to the depressed amount. When depressed, the accelerator pedal 32 instructs acceleration of the forklift 10 (ON operation). When released (non-operated state), the accelerator pedal 32 does not instruct acceleration the forklift 10 (OFF operation).

An inching switch 71 is provided at the inching pedal 33 to detect the depression state of the inching pedal 33. The inching switch 71 is connected to the vehicle control apparatus 52 and outputs a detection signal (inching signal) that corresponds to the depression state. More specifically, when the clutch (the advancing clutch 42 or the reversing clutch 43) is engaged, the inching switch 71 outputs a detection signal. The clutch (the advancing clutch 42 or the reversing clutch 43) is either in an engaged state for transmitting power, a disengaged state for disconnecting power transmission, or a partially engaged state when being shifted between the engaged state and the disengaged state. Therefore, in this embodiment, the inching switch 71 is installed in a such a manner as to output a detection signal when the clutch is in the engaged state. The inching switch 71 does not output detection signals when the clutch is in the disengaged state (disconnection state) and the partially engaged state. When depressed, the inching pedal 33 disengages the clutch (ON operation). When released, the inching pedal 33 is engages the clutch (OFF operation). When the operation of the inching pedal 33 is shifted form the ON operation to the OFF operation, the forklift 10 is shifted from a driving force disconnection state to a driving force connection state. When the operation of the inching pedal 33 is shifted form the OFF operation to the ON operation, the forklift 10 is shifted from the driving force connection state to the driving force disconnection state A brake switch 72 is provided at the brake pedal 34 to detect the depression state of the brake pedal 34. The brake switch 72 is connected to the vehicle control apparatus 52 and outputs a detection signal (brake signal) that corresponds to the depression state. More specifically, the brake switch 72 outputs a detection signal when the brake pedal 34 is depressed. When the driver depresses solely the brake pedal 34, the brake switch 72 or when the driver depresses the brake pedal 34 together with the inching pedal 33, the brake switch 72 outputs a detection signal. When depressed, the brake pedal 34 causes the drum brakes 51 to apply braking force to the drive wheels 14 (ON operation). When released, the brake pedal 34 stops causing the drum brakes 51 to apply braking force to the drive wheels 14 (OFF operation).

In the forklift 10 of the present embodiment, when the engine 16 is started with the advance/reverse lever 31 at the neutral position [N], the advancing relay coil 60*b* and the reversing relay coil 61*b* are excited to open the advancing normally-closed contact 60*a* and the reversing normally-closed contact 61*a*. Thus, the advancing electromagnetic valve 44 and the reversing electromagnetic valve 45 are not energized. As a result, the advancing clutch 42 and the reversing clutch 43 are disengaged.

After the engine 16 is started, when the driver shifts the advance/reverse lever 31 from the neutral position [N] to the advance position [F], the vehicle control apparatus 52 receives a detection signal from the shift switch 69 (a signal indicating that the lever 31 has been shifted to the advance position [F]), and de-excites the advancing relay coil 60*b*, thereby energizing the advancing electromagnetic valve 44. As a result, the advancing clutch 42 is engaged. After the engine 16 is started, when the driver shifts the advance/reverse lever 31 from the neutral position [N] to the reverse position [R], the vehicle control apparatus 52 receives a detection signal from the shift switch 69 (a signal indicating that the lever 31 has been shifted to the reverse position [R]), and de-excites the reversing relay coil 61*b*, thereby energizing the reversing electromagnetic valve 45. As a result, the reversing clutch 43 is engaged. When the driver depresses the accelerator pedal 32, the engine control apparatus 53 receives a detection signal from the accelerator pedal position sensor 70 (a signal in accordance with the depressed amount of the accelerator pedal 32) and controls the throttle actuator 35. The speed of the engine 16 is adjusted accordingly, and the forklift 10 travels in a direction that corresponds to the position of the advance/reverse lever 31 (advancing direction or reversing direction).

When the driver manipulates the lift lever 29, the vehicle control apparatus 52 receives a detection signal from the lift lever sensor 67 (a signal in accordance with the manipulation amount of the lift lever 29) and controls the fork lifting/lowering electromagnetic control valve 39. When the driver manipulates the tilt lever 30 during loading, the vehicle control apparatus 52 receives a detection signal from the tilt lever sensor 68 (a signal in accordance with the manipulation amount of the tilt lever 30) and controls the fork tilting electromagnetic control valve 38. Then, the driver depresses the inching pedal 33 during loading, thereby causing the clutches (the advancing clutch 42 and the reversing clutch 43) to be partially engaged or disengaged, and depresses the accelerator pedal 32. These manipulations (actions) causes rotation of the engine 16 to actuate the hydraulic pump 36. When the lift lever 29 is manipulated, hydraulic oil is supplied to the lift cylinders 25 by the fork lifting/lowering electromagnetic control valve 39. When the tilt lever 30 is manipulated, hydraulic oil is supplied to the tilt cylinders 24 by the fork tilting electromagnetic control valve 38. As a result, the lift cylinders 25 are extended or retracted in accordance with the manipulation direction of the lift lever 29, and the forks 22 are lifted or lowered, accordingly. Also, the tilt cylinders 24 are extended or retracted in accordance with the manipulation direction of the tilt lever 30, and the mast assembly 19 (the forks 22) are inclined forward or rearward, accordingly. During a loading operation of the forklift 10, the inching pedal 33 is depressed, the clutch (the advancing clutch 42 and the reversing clutch 43) is partially engaged or disengaged (disconnected). When the forklift 10 is driven after loading operation, the inching pedal 33 is released so that the clutch (advancing clutch 42 and the reversing clutch 43) is engaged. Then, the accelerator pedal 32 is depressed for instructing acceleration.

The forklift 10 of the present embodiment as described above operates in drive control modes, which include a normal driving mode, a limited driving mode, and a loading priority mode. In accordance with these modes, the vehicle control apparatus 52 and the engine control apparatus 53 perform various control procedures. The normal driving mode refers to a drive control mode in which the forklift 10 is permitted to travel without any limitation on the driving. The limited driving mode refers to a drive control mode in which the forklift 10 is permitted to travel with limitation on the driving. In the present embodiment, the maximum vehicle speed and acceleration/deceleration during driving are limited in accordance with the load state in the limited driving mode. The load state represents the state of a load on the forks 22. In this embodiment, the load state is determined based on the height, the weight, and the tilt angle. During the driving of the forklift 10 according to the limited driving mode, the mode is shifted to the loading priority mode when a predetermined limit cancellation condition is met. In the loading priority mode, the driving of the forklift 10 is controlled such that the loading operation with the forks 22 is prioritized.

Hereafter, various control procedures executed by the vehicle control apparatus 52 and the engine control apparatus 53 will be described. The vehicle control apparatus 52 and the engine control apparatus 53 execute the control procedures shown below in accordance with control programs. In the present embodiment, the CPU 54 of the vehicle control apparatus 52 functions as a limitation determining section. The CPU 54 of the vehicle control apparatus 52 and the CPU 57 of the engine control apparatus 53 function as a control section.

Map data stored in the memory 55 of the vehicle control apparatus 52 will be described with reference FIG. 4 to FIG. 6.

Figure 4:
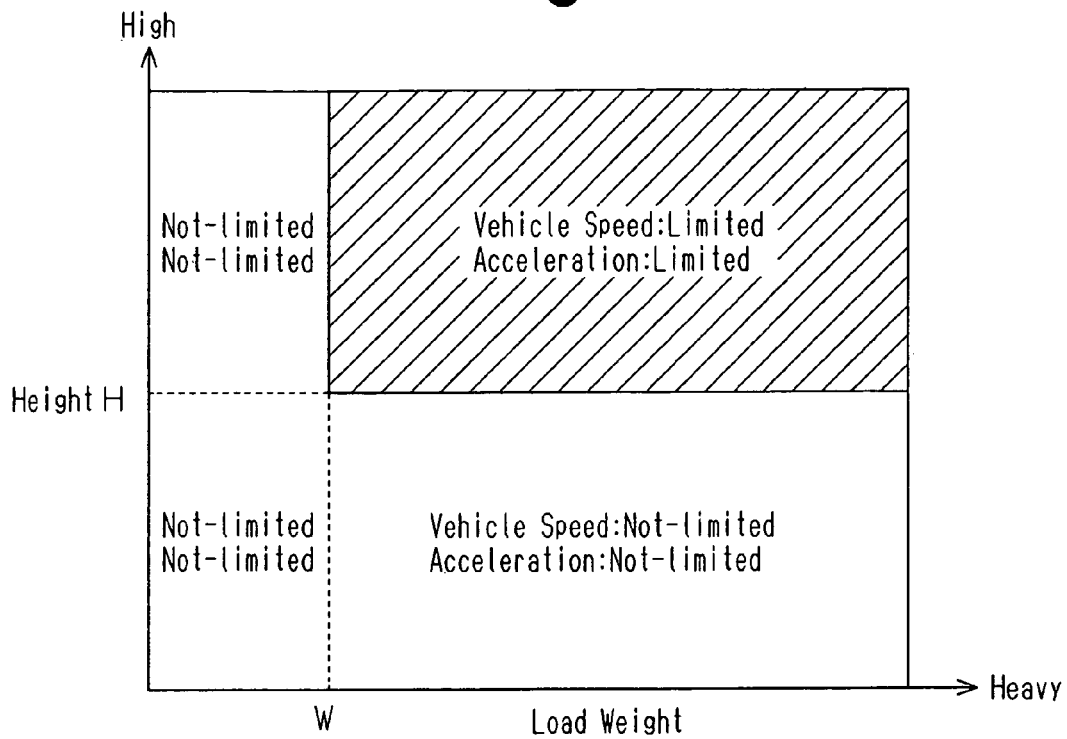
FIG. 4 is a relational diagram showing a limitation region and a no-limitation region of a vehicle, defined according to a load state.

The map data of FIG. 4 is referred to for determining whether the load state requires that the driving of the forklift 10 be limited (hereafter, referred to as necessity determining data). In this embodiment, the necessity determining data defines a limitation region, in which the maximum speed and acceleration/deceleration are limited based on two parameters, or the fork height and the load weight, and a non-limitation region, in which no limitation is imposed. Specifically, a region corresponding to fork heights equal to or more than a fork height H and load weights equal to or more than a load weight W is set as the limitation region, and a region corresponding to either fork heights less than the fork height H or load weights less than the load weight W is set as the non-limitation region. In the necessity determining data shown in FIG. 4, a region in which the fork height is high and the load weight is heavy, or a region in which the load state is harsh, is set as the limitation region. In FIG. 4, the limitation region is shown by a diagonally shaded area.

Figure 5:
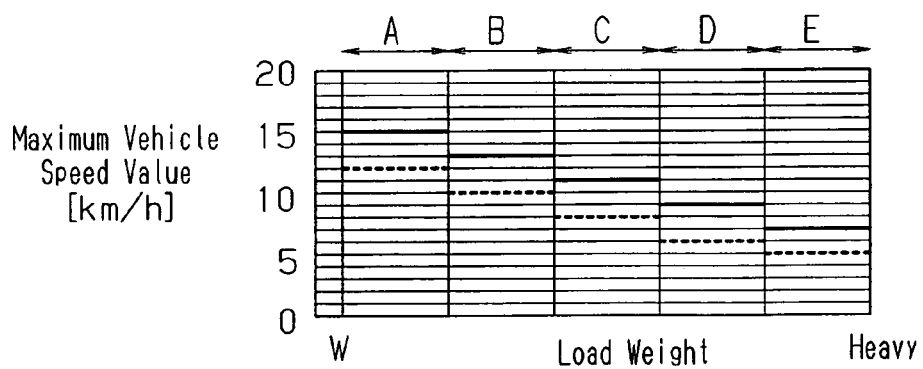
FIG. 5 is a relational diagram showing the relationship between the load state and a maximum vehicle speed value.

Map data of FIG. 5 is referred for computing a maximum vehicle speed value (speed limit) in the case where the maximum vehicle speed is limited, that is, when the load state is determined to be in the limitation region based on the necessity determining data of FIG. 4. The map data of FIG. 5 is hereafter referred to as vehicle speed computing data. In this embodiment, the vehicle speed computing data defines the maximum vehicle speed value [km/h] based on two parameters, or the load weight and the tilt angle. Specifically, the load region equal to or more than the load weight W is divided into several regions (in this embodiment, five regions A, B, C, D, E as shown in FIG. 5), and the maximum vehicle speed value is defined based on whether the tilt angle is in the rearward tilt range in each of the five regions. The case in which the tilt angle is in the rearward tilt range refers to a case in which the mast assembly 19 (the forks 22) is inclined rearward with respect to the vehicle body 11 (rearward inclined state). The case other than the rearward tilt range refers to a case where the mast assembly 19 is vertical (the forks 22 are horizontal) and a case where the mast assembly 19 is inclined forward with respect to the vehicle body 11 (forward inclined state).

According to the vehicle speed computing data of FIG. 5, the maximum vehicle speed value in the case where the tilt angle is in the rearward tilt range is shown by solid lines. The maximum vehicle speed value in the case where the tilt angle is out of the rearward tilt range is shown by broken lines. For example, in the region A, the maximum vehicle speed value in the case where the tilt angle is in the rearward tilting range is set to 15 (km/h), and the maximum vehicle speed value in the case where the tilt angle is out of the rearward tilting range is set to 12 (km/h). That is, when the tilt angle is out of the rearward tilt range, the center of gravity of the load is located in a front portion of the vehicle. On the other hand, when tilt angle is in the rearward tilt range, the center of gravity of the load is located in a rear portion of the vehicle. Therefore, when the tilt angle is out of the rearward tilt range, the load state is harsher than the case where the tilt angle is in the rearward tilt range. Thus, even if the weight of the load is the same, the maximum vehicle speed value varies in accordance with the tilt angle. When the tilt angle is out of the rearward tilt range, the maximum vehicle speed is set lower than the case where the tilt angle is in the rearward tilt range.

Figure 6:
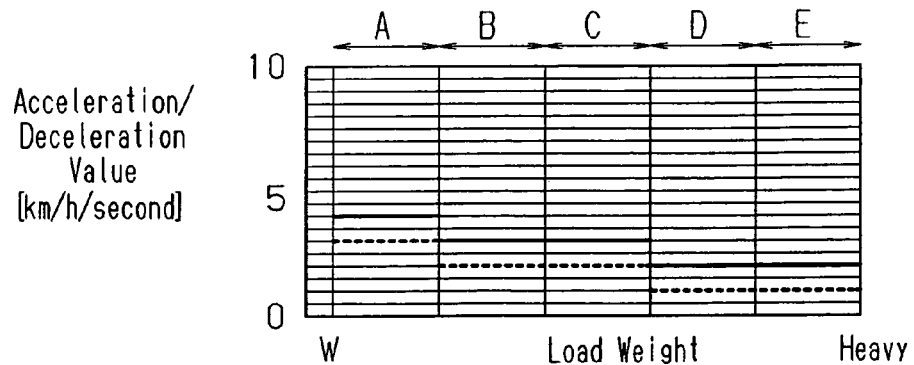
FIG. 6 is a relational diagram showing the relationship between the load state and an acceleration/deceleration value.

Map data of FIG. 6 is referred for computing an acceleration/deceleration value in the case where the acceleration/deceleration is limited, that is, when the load state is determined to be in the limitation region based on the necessity determining data of FIG. 4. The map data of FIG. 5 is hereafter referred to as acceleration/deceleration computing data. In this embodiment, the acceleration/deceleration computing data defines the acceleration/deceleration value [km/h/second] based on two parameters, or the load weight and the tilt angle. Specifically, the load region equal to or more than the load weight W is divided into several regions (in this embodiment, five regions A, B, C, D, E as shown in FIG. 5), and the acceleration/deceleration value is defined based on whether the tilt angle is in the rearward tilt range in each of the five regions. [km/h/second] is a value obtained by converting the acceleration/deceleration value per second into the acceleration/deceleration value per hour. In the acceleration/deceleration data of FIG. 6, the load region equal to or more than the weight W is divided at the same values of the weight as the vehicle speed computation data of FIG. 5.

According to the acceleration/deceleration computing data of FIG. 6, the acceleration/deceleration value in the case where the tilt angle is in the rearward tilt range is shown by solid lines. The acceleration/deceleration value in the case where the tilt angle is out of the rearward tilt range is shown by broken lines. For example, in the region A, the acceleration/deceleration value in the case where the tilt angle is in the rearward tilting range is set to 4 km/h/second, and the acceleration/deceleration value in the case where the tilt angle is out of the rearward tilting range is set to 3 km/h/second. That is, even if the weight of the load is the same, the acceleration/deceleration value varies in accordance with the tilt angle. When the tilt angle is out of the rearward tilt range, the acceleration/deceleration value is set lower than the case where the tilt angle is in the rearward tilt range. Hereinafter, in the acceleration/deceleration data shown in FIG. 6, acceleration/deceleration values of 1 km/h/second, 2 km/h/second, 3 km/h/second, and 4 km/h/second are referred to, when necessary, as acceleration/deceleration level 1, acceleration/deceleration level 2, acceleration/deceleration level 3, and acceleration/deceleration level 4.

Figure 7:
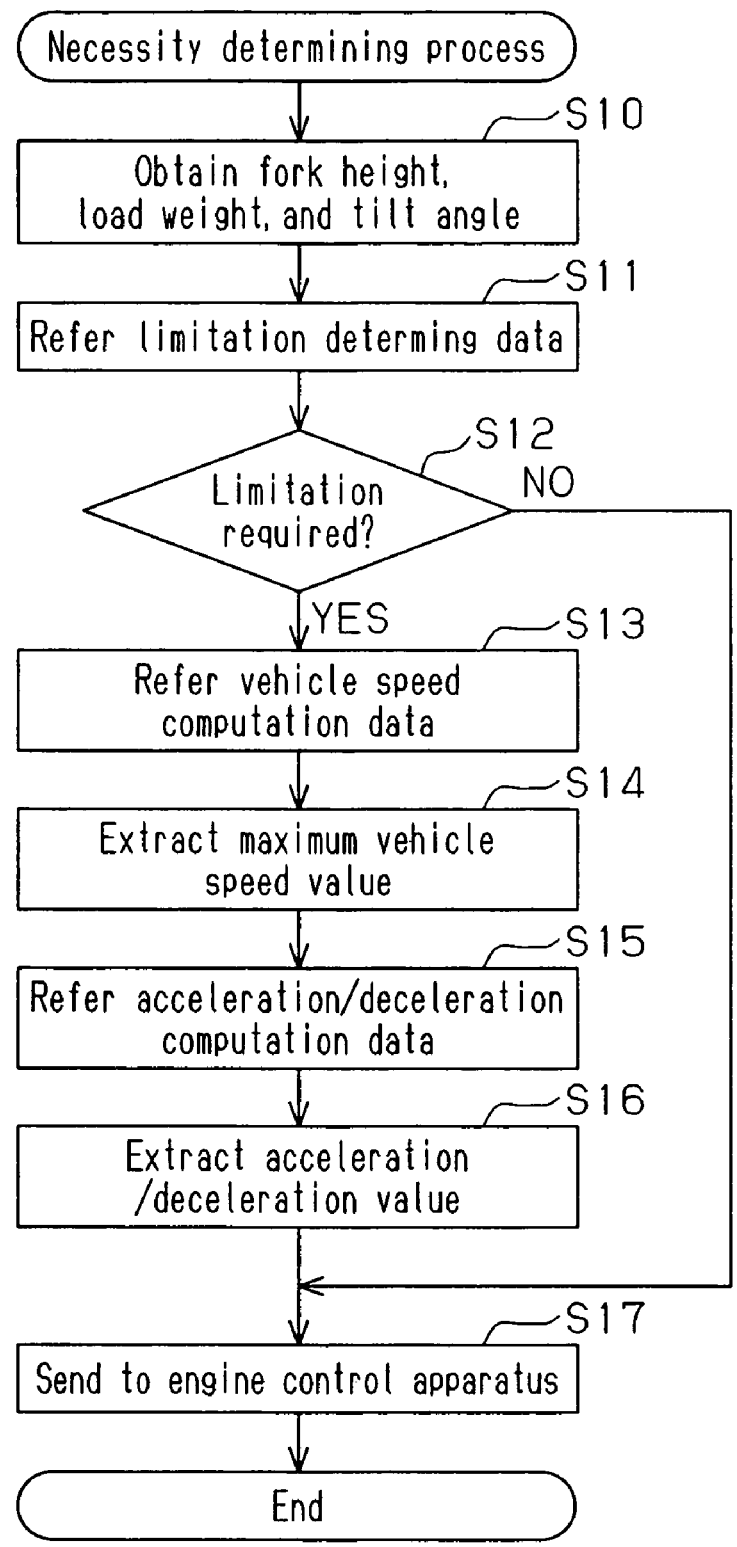
FIG. 7 is a flowchart showing a limitation determining process.

FIG. 7 shows a limitation determining process executed by the CPU 54 of the vehicle control apparatus 52. The limitation determining process is a process for determining the load state based on map data shown in FIGS. 4 to 6 and extracting (determining) the maximum vehicle speed and the acceleration/deceleration.

In the limitation determining process, the CPU 54 obtains information related to the fork height, the load weight, and the tilt angle for determining the load state (step S10). At step S10, the CPU 54 obtains the fork height, the tilt angle, and the load weight from detection signals from the height sensor 64, the tilt angle sensor 65, and the load weight sensor 66. Subsequently, the CPU 54 refers to the necessity determining data shown in FIG. 4 (step S11), and determines whether the load state requires limitation on the vehicle speed (the maximum vehicle speed and the acceleration/deceleration) based on the information regarding the fork height and the load weight obtained at step S10 and the data of FIG. 4 (step S12). At step S12, the CPU 54 determines whether the load state is in the limitation region, which corresponds to high fork heights and heavy load weights.

If the decision outcome of step S12 is positive (limitation required), the CPU 54 refers to the vehicle speed computation data shown in FIG. 5 (step S13), and extracts the maximum vehicle speed value based on the referred data and the information related to the weight load and the tile angle obtained at step S10 (step S14). At step S14, if, for example, the load weight is in the region B, the CPU 54 extracts 13 km/h as the maximum vehicle speed value in the case where the tilt angle is in the rearward tilt range, and extracts 10 km/h in the case where the tilt angle is out of the rearward tilt range. After extracting the maximum vehicle speed value at step S14, the CPU 54 stores the extracted maximum vehicle speed value in the memory 55.

Subsequently, the CPU 54 refers to the acceleration/deceleration data shown in FIG. 5 (step S15), and extracts the acceleration/deceleration value based on the referred data and the information related to the weight load and the tile angle obtained at step S10 (step S16). At step S16, if, for example, the load weight is in the region B, the CPU 54 extracts 3 km/h/second as the acceleration/deceleration value in the case where the tilt angle is in the rearward tilt range, and extracts 2 km/h/second in the case where the tilt angle is out of the rearward tilt range. After extracting the acceleration/deceleration value at step S16, the CPU 54 stores the extracted acceleration/deceleration value in the memory 55.

Subsequently, the CPU 54 sends a limitation signal to the engine control apparatus to instruct the maximum vehicle speed value extracted at step S14 and the acceleration/deceleration value extracted at step S16. Thereafter, the CPU 54 ends the limitation determining process. If the decision outcome of step S12 is negative (limitation not required), the CPU 54 proceeds to step S17, and sends a limitation signal to the engine control apparatus to instruct not to limit the maximum vehicle speed and the acceleration/deceleration. If the decision outcome of step S12 is negative, the CPU 54 stores in the memory 55 the fact that the maximum vehicle speed and the acceleration/deceleration will not be limited. Thereafter, the CPU 54 ends the limitation determining process. When the decision outcome at step S12 is negative, the load state is in the non-limitation region (low fork height or light load weight).

Next, the contents of control of the engine control apparatus 53 will now be described.

When it is determined that the driving of the vehicle should not be limited in the limitation determining process, the CPU 57 of the engine control apparatus 53 controls the throttle actuator 35 based on a detection signal of the accelerator pedal position sensor 70 provided at the accelerator pedal 32, thereby adjusting the engine speed. That is, the CPU 57 does not limit the maximum vehicle speed and the acceleration/deceleration, but adjusts the engine speed in accordance with the depressed amount of the accelerator pedal 32 (operated amount), thereby driving the forklift 10. When imposing no limitation on the driving of the vehicle, the CPU 57 executes the control according to the normal driving mode. In the normal driving mode, the engine speed is increased in accordance with the depressed amount of the accelerator pedal, and the vehicle speed is increased in accordance with the depressed amount of the accelerator pedal 32.

Figure 8:
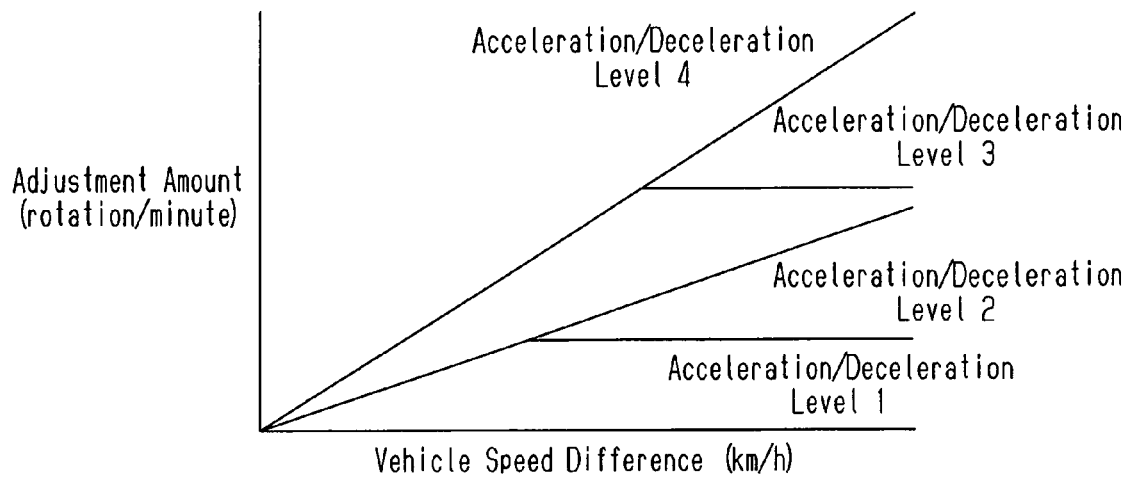
FIG. 8 is a relational diagram showing the relationship among an adjustment amount of the engine speed, a vehicle speed difference, and an acceleration/deceleration level.

On the other hand, when it is determined that the driving of the vehicle should be limited in the limitation determining process, the CPU 57 adjusts the engine speed based on the map data shown in FIG. 8 (hereafter, also referred to as engine speed adjusting data). The engine speed adjusting data is used for computing an adjustment amount of the engine speed when limiting the driving of the vehicle, and is stored in the memory 58 of the engine control apparatus 53.

The engine speed adjustment data of the present embodiment is a graph representing the relationship between the difference between the maximum vehicle speed value and the actual vehicle speed (hereafter, referred to as vehicle speed difference) and the adjustment amount of the engine speed. The relationship is determined according to the four acceleration/deceleration levels [1] to [4]. The vehicle speed difference is a difference between the maximum vehicle speed value extracted at step S14 of the limitation determining process and the vehicle speed detected by the vehicle speed sensor 63. In the engine speed adjustment data, the relationship between the vehicle speed difference and the engine speed is defined such that the adjustment amount of the engine speed increases as the vehicle speed difference increases. The relationship between the vehicle speed difference and the adjustment amount of the engine speed is defined such that, as the acceleration/deceleration level approaches [1] (as the load state becomes harsher), the adjustment amount of the engine speed is reduced in relation to the vehicle speed difference. That is, since as the acceleration/deceleration level approaches the level [1], the adjustment amount of the engine speed decreases, the forklift 10 is gradually accelerated and gradually decelerated.

The CPU 57 obtains the current vehicle speed from a detection signal of the vehicle speed sensor 63 at every predetermined control cycle, and subtracts the obtained vehicle speed from the maximum vehicle speed value, thereby computing the vehicle speed difference. Subsequently, the CPU 57 obtains the acceleration/deceleration value (the value of the acceleration/deceleration level) stored in the memory 58. Based on the vehicle speed difference and the acceleration/deceleration level, the CPU 57 computes the adjustment amount of the engine speed from the engine speed adjustment data shown in FIG. 8. After computing the adjustment amount of the engine speed, the CPU 57 controls the throttle actuator 35 based on the adjustment amount, thereby adjusting the throttle opening degree. The speed of the engine 16 is adjusted, accordingly. In this manner, the CPU 57 performs feedback control such that the actual vehicle speed does not exceed the maximum vehicle speed value. That is, when limiting the maximum vehicle speed and the acceleration/deceleration, the CPU 57 adjusts the engine speed such that the vehicle speed is equal to or less than the maximum vehicle speed regardless of the depressed amount of the accelerator pedal 32 (operated amount), thereby driving the forklift 10. When limiting the driving of the vehicle, the CPU 57 performs a control procedure according to the limited driving mode. In the limited driving mode, increase of the engine speed is suppressed such that the vehicle speed does not exceed the maximum vehicle speed. Even if the accelerator pedal 32 is fully depressed, the vehicle speed does not exceed the maximum vehicle speed. Also, in the limited driving mode, the acceleration/deceleration is limited. That is, the degree of acceleration and the degree of deceleration vary according to the acceleration/deceleration level.

A mode switching process shown in FIG. 9 executed by the CPU 54 of the vehicle control apparatus 52 will now be described.

Figure 9:
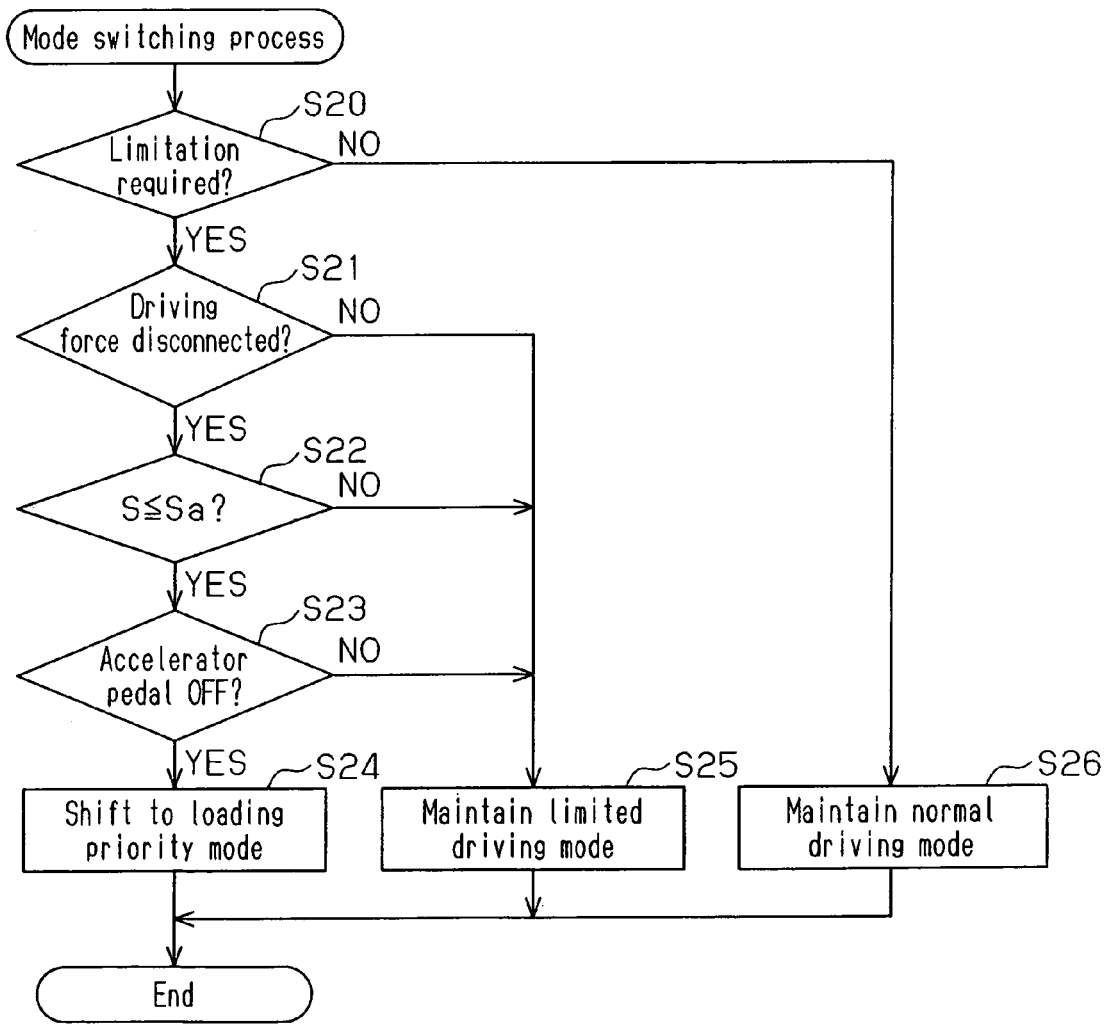
FIG. 9 is a flowchart showing a mode switching process.

The mode switching process shown in FIG. 9 is a process for determining whether the limited driving mode should be shifted to the loading priority mode.

In the mode switching process, the CPU 54 determines whether the maximum vehicle speed and the acceleration/deceleration need to be limited (step S20). At step S20, the CPU 54 determines whether the drive control mode is the limited driving mode. At step S20, the CPU 54 performs the determination of step S20 based on the decision outcome at step S12 of the limitation determining process. When the memory 55 retains the maximum vehicle speed value and the acceleration/deceleration value, the CPU 54 determines that the decision outcome of step S20 is positive. If the memory 55 does not retain the maximum vehicle speed value and the acceleration/deceleration value, the CPU 54 determines that the decision outcome of step S20 is negative.

If the decision outcome of step S20 is positive, the CPU 54 determines whether the driving force is disconnected (step S21). In the present embodiment, the CPU 54 monitors input of a detection signal of the brake switch 72 at step S21, and performs the determination based on whether the detection signal has been inputted. When receiving a detection signal from the brake switch 72, the CPU 54 detects that the driving force is disconnected. In this case, the decision outcome of step S21 is positive. When receiving no detection signal, the decision outcome of step S21 is negative. In the forklift 10 of the present embodiment, depression of the inching pedal 33 to a certain extent causes the brake pedal 34 to be depressed in conjunction with the depression of the inching pedal 33. When the brake pedal 34 is depressed in conjunction with the inching pedal 33, the clutch (the advancing clutch 42 and the reversing clutch 43) is being shifted from the engaged state to the disengaged state. Thus, at step S21, whether the driving force is disconnected is determined based on the input of the detection signal from the brake switch 72. In the present embodiment, the brake switch 72 and the CPU 54 of the vehicle control apparatus 52 form a disconnection detection section.

If the decision outcome at step S21 is positive, the CPU 54 inputs a detection signal of the vehicle speed sensor 63 and compares the vehicle speed obtained from the detection signal (represented by S in FIG. 9) with a predetermined limitation canceling vehicle speed (represented by Sa in FIG. 9). The CPU 54 then determines whether the vehicle speed S is greater than or equal to the limitation canceling vehicle speed Sa. The limitation canceling vehicle speed Sa is a vehicle speed for permitting the limitations on the vehicle driving (in the present embodiment, the limitation on the maximum vehicle speed and the acceleration/deceleration) to be cancelled. Specifically, the limitation canceling speed Sa is a vehicle speed for permitting the limited driving mode to be shifted to the loading priority mode. In the present embodiment, the limitation canceling vehicle speed Sa is set to a value obtained by subtracting a certain value (for example, 2 km/h) from the maximum vehicle speed used in the limited driving mode. If the decision outcome at step S21 is positive ($S \leq Sa$), the CPU 54 inputs a detection signal from the accelerator pedal position sensor 70, and determines whether the OFF operation of the accelerator pedal 32 is performed based on the detection signal.

If the decision outcome at step S23 is positive, the CPU 54 shifts the driving mode from the limited driving mode to the loading priority mode (step S24), and ends the mode switching process. After having shifted the driving mode from the limited driving mode to the loading priority mode, the CPU 54, at step S24, outputs a mode-signal indicating the shift to the engine control apparatus 53. As described in the mode switching process in the present embodiment, the CPU 54 shifts the driving mode from the limited driving mode to the loading priority mode when three conditions are met, or when the driving force is disconnected in the limited driving mode, the vehicle speed S is less than or equal to the limitation canceling vehicle speed Sa, and the OFF operation of the accelerator pedal 32 is executed. In the present embodiment, these three conditions correspond to a limitation canceling condition.

On the other hand, if the decision outcome at step S22 or step S23 is negative, the limitation canceling condition is not met during the limited driving mode. In this case, the CPU 54 does not shift the driving mode to the loading priority mode (step S24), but maintains the driving mode at the limited driving mode (step S25) ends the mode switching process. If the decision outcome at step S20 is negative, the CPU 54 maintains the normal driving mode as the driving mode (step S26), and ends the mode switching process.

When shifting the driving mode to the loading priority mode through the mode switching process, the CPU 57 of the engine control apparatus 53 cancels the limitation on the maximum vehicle speed and the acceleration/deceleration. Then, based on a detection signal from the accelerator pedal position sensor 70 provided at the accelerator pedal 32, the CPU 57 controls the throttle actuator 35, thereby adjusting the engine speed. That is, the CPU 57 adjusts the engine speed in accordance with the depressed amount of the accelerator pedal 32 (operated amount) as in the normal driving mode. At this time, since the driving force is disconnected, the power of the engine 16 is not transmitted to the drive wheels 14 of the forklift 10. Therefore, the power of the engine serves as driving force for actuating the loading device 12 of the forklift 10. By manipulating the lift lever 29 and the tilt lever 30, the hydraulic pump 36 is actuated and the loading device 12 (the forks 22) are actuated. That is, when the lift lever 29 is manipulated, the actuation of the hydraulic pump 36 and the control of the CPU 54 of the vehicle control apparatus 52 causes hydraulic oil to be supplied to the lift cylinders 25 through the fork lifting/lowering electromagnetic control valve 39, so that the forks 22 are lifted or lowered. Also, when the tilt lever 30 is manipulated, the actuation of the hydraulic pump 36 and the control of the CPU 54 of the vehicle control apparatus 52 causes hydraulic oil to be supplied to the tilt cylinders 24 through the fork tilting electromagnetic control valve 38, so that the forks 22 (the mast assembly 19) are tilted.

When shifting the driving mode to the loading priority mode through the mode switching process shown in FIG. 9, the CPU 54 of the vehicle control apparatus 52 executes a vehicle speed monitoring process described below. The vehicle speed monitoring process is a process for determining, when the driving mode is shifted from the limited driving mode to the loading priority mode, whether the shifting of the modes is performed with the transmission of the driving force corresponding to the drive wheels 14 is completely disconnected. The vehicle speed monitoring process is executed for reliably suppressing a sudden acceleration of the forklift 10 due to the shifting of the modes. For example, the process is executed for determining shifting of the modes with the clutch partially engaged and shifting of the modes due to a failure of a section for detecting that the transmission of the driving force is disconnected (the brake switch 72 in this embodiment).

In the vehicle speed monitoring process, the CPU 54 inputs a detection signal of the vehicle speed sensor 63 to obtain the vehicle speed, and determines whether the vehicle speed exceeds the maximum vehicle speed value in the limited driving mode (the value determined at step S14 of the limitation determining process. That is, the CPU 54 determines whether the forklift 10 is accelerated in the loading priority mode. If the decision outcome is positive, the vehicle speed exceeds the maximum vehicle speed value. In this case, the CPU 54 temporarily returns the drive control mode to the limited driving mode, and outputs a mode signal indicating the shift to the CPU 57 of the engine control apparatus 53. The CPU 57 of the engine control apparatus 53 adjusts the engine speed based on the maximum vehicle speed value and the acceleration/deceleration value stored in the memory 58, thereby limiting the driving of the vehicle. As a result, the driving of the forklift 10 is limited, and its speed is reduced to the maximum vehicle speed value.

If the drive control mode is returned to the limited driving mode, the CPU 54 determines, based on a detection signal of the accelerator pedal position sensor 70, whether the OFF operation of the accelerator pedal has been performed. If the ON operation of the accelerator pedal 32 is performed, the CPU 54 executes the mode switching process shown in FIG. 9. If the limitation canceling condition is met, the CPU 54 returns the drive control mode to the loading priority mode. On the other hand, if the ON operation of the accelerator pedal 32 keeps being performed, the CPU 54 maintains the drive control mode to the limited driving mode. The vehicle speed monitoring process ensures the fail-safe capability against erroneous operations and erroneous detections.

The present embodiment has the following advantages.

(1) During the period of limitations on the driving, when the limitation canceling condition including that the driving force is disconnected is met, the driving limitation is cancelled, and the driving mode is shifted to the loading priority mode, in which the loading operation is prioritized. The driving of the vehicle is controlled by taking into consideration the driver's intension to disconnect the driving force and actuate the loading device 12. Even when the loading device 12 actuated during the driving with limitation, the loading device 12 is actuated without degrading the stability of the vehicle. That is, since the limitation on the driving is cancelled with the driving force disconnected, the forklift 10 is prevented from being abruptly accelerated even if the accelerator pedal 32 is dressed for actuating the loading device 12 and the engine 16 is revved up. When the loading device 12 is operating, the driving limitations are cancelled. Thus, the loading device 12 is actuated while making the most of the power of the engine 16. Therefore, the stability of the vehicle and the workability of the loading operation are both improved.

(2) In addition to disconnection of the driving force, the limitation canceling conditions include a state where the vehicle speed S is equal to or less than the limitation canceling vehicle speed Sa. Since a condition related to the vehicle speed is included in the limitation canceling conditions, the driving of the vehicle is controlled while appropriately taking into consideration the driver's intention to actuate the loading device 12. That is, when the vehicle speed is low, it is assumed that the forklift 10 has approached a spot for performing a loading operation and in preparation for the loading operation. The limitations on driving are cancelled in accordance with the operation state.

(3) Further, the limitation canceling condition includes a state in which the OFF operation of the accelerator pedal 32 is performed. Since the accelerator pedal 32 is a section for instructing acceleration of the forklift 10, the non-operated state of the accelerator pedal 32 reliably represents the intention of the driver to stop the vehicle. Therefore, the driving of the vehicle is controlled while properly taking into consideration the driver's intension to actuate the loading device 12.

(4) When the vehicle speed surpasses the maximum vehicle speed value during the loading priority mode, the loading priority mode is ended and the driving mode is shifted to the limited driving mode. That is, if the vehicle speed surpasses the maximum vehicle speed value despite the fact that the limitation canceling condition is met and the driving mode is shifted to the loading priority mode, it is possible that the driving limitation has been cancelled against the intention of the driver due to, for example, erroneous detection. Therefore, in such a case, the loading priority mode is ended and the driving mode is returned to the limited driving mode, so that the driving of the vehicle is prevented from being unstable. That is, driving with the driving limitation cancelled when the driver has no intention to actuate the loading device 12 causes the vehicle to continue driving in an unstable state. Such a state therefore must be corrected in an early state.

(5) When the driving mode is returned from the loading priority mode to the limited driving mode, the driving mode is returned to the loading priority mode when the returning condition is met. The return conditions are determined to include at least a state where the accelerator pedal 32 is in the non-operated state. The intention of the driver to perform the OFF operation of the accelerator pedal 32 thereby stopping the driving of the forklift 10 is reliably detected. Thus, the driving mode is returned to the loading priority mode after confirming that the driver has the intention to actuate the loading device 12.

(6) Whether the driving state is the driving force disconnection state is detected based on the operation state of the brake pedal 34. The brake pedal 34 is operated in conjunction with the inching pedal 33 when the inching pedal 33 is depressed by a certain amount. Thus, when the brake pedal 34 is depressed, the inching pedal 33 is depressed by a relatively great amount. Therefore, the disengagement of the clutch (the advancing clutch 42 and the reversing clutch 43) is reliably detected.

Second Embodiment

A second embodiment of the present invention will now be described with reference to FIGS. 10 and 11. In the following embodiments, explanations of the same components of the already described embodiment will be omitted or simplified.

In this embodiment, at step S21 of the mode switching process shown in FIG. 9, the detection that the driving state is the driving force disconnection state is performed by detecting the clutch pressure of the pressure receiving chambers 42a, 43a of the advancing clutch 42 and the reversing clutch 43.

The structure of the forklift 10 of this embodiment will now be described with reference to FIG. 10. FIG. 10 mainly shows differences from the forklift 10 described in the first embodiment (shown in FIG. 3). The components (structure) that are not shown in FIG. 10 are the same as those of the forklift 10 shown in FIG. 3.

Figure 10:
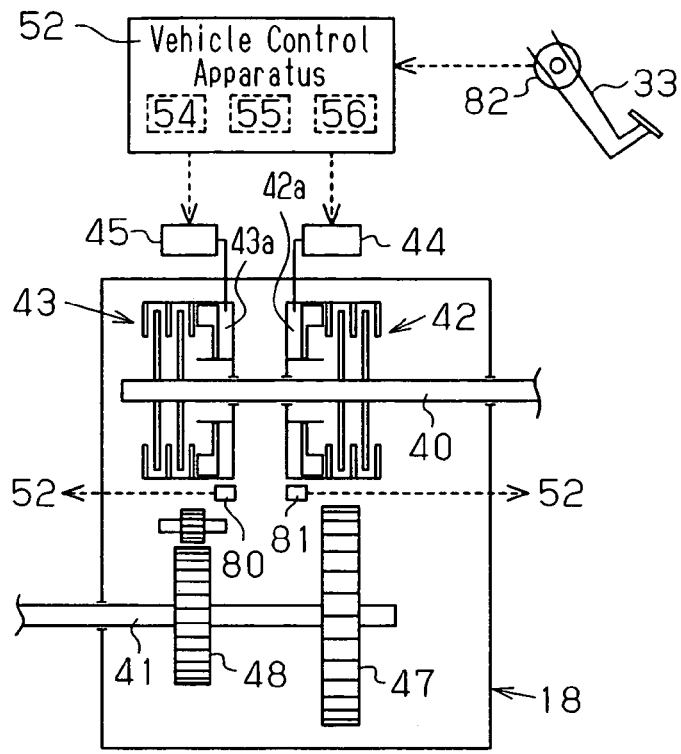
FIG. 10 is a diagrammatic view illustrating the structure of a forklift according to a second embodiment.

As shown in FIG. 10, clutch pressure sensors 80, 81 are provided at the advancing clutch 42 and the reversing clutch 43 to detect the clutch pressure (hydraulic pressure) of the pressure receiving chambers 42a, 43a. The clutch pressure sensors 80, 81 are connected to the vehicle control apparatus 52 and detect the hydraulic pressures in the pressure receiving chambers 42a, 43a. The clutch pressure sensors 80, 81 output detection signals (clutch pressure signals) that correspond to the hydraulic pressures. The clutch pressure sensors 80, 81 are formed, for example, by pressure sensors. An inching pedal position sensor 82 is provided at the inching pedal 33 of this embodiment to detect the depressed amount (pedal stroke) of the inching pedal 33. The inching pedal position sensor 82 is connected to the vehicle control apparatus 52 and outputs a detection signal (pedal depressed amount signal) corresponding to the depressed amount. The way in which the inching pedal 33 is operated is the same as that of the first embodiment. That is, when depressed, the inching pedal 33 is operated to disengage the clutch. When released, the inching pedal 33 is operated to engage the clutch.

Figure 11:
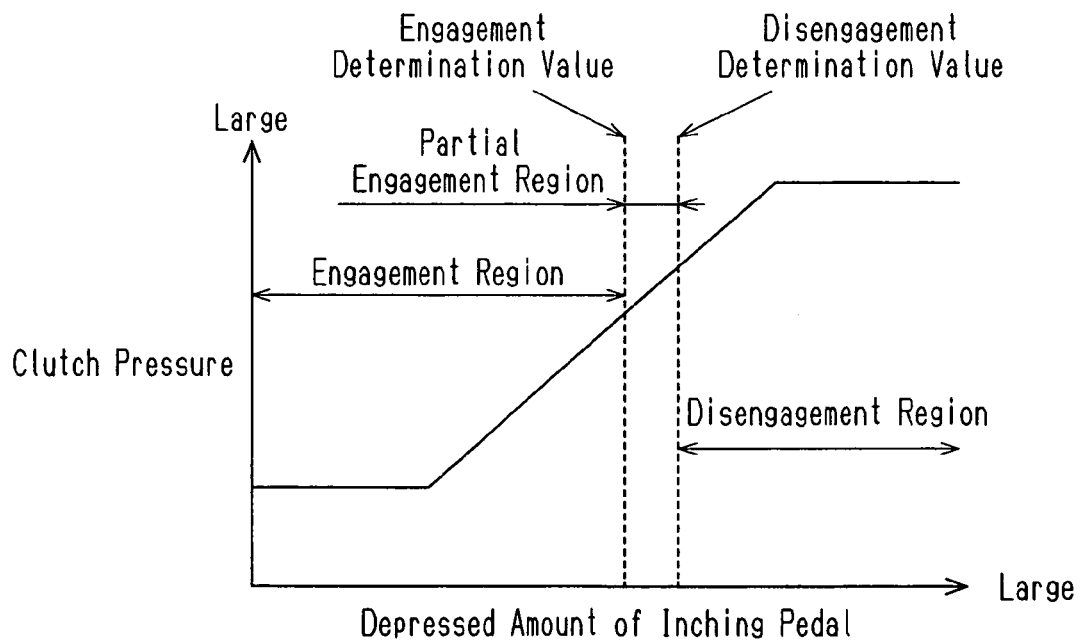
FIG. 11 is a relational diagram showing the relationship between a clutch pressure and the depressed amount of an inching pedal.

The memory 55 of the vehicle control apparatus 52 stores map data (hereafter, referred to as connection determining data) shown in FIG. 11. The connection determining data is a graph representing the relationship between the depressed amount of the inching pedal 33 and the clutch pressure. When the clutch pressure in the pressure receiving chambers 42a, 43a of the advancing clutch 42 and the reversing clutch 43 of this embodiment is lowered, the engaging force increased so that the clutch is engaged. When the clutch pressure is increased, the engaging force is reduced, and the clutch is disengaged. That is, when the depressed amount of the inching pedal 33 is small, the clutch is engaged and the clutch pressure is reduced. When the depressed amount of the inching pedal 33 is great, the clutch is disengaged, and clutch pressure is increased. The connection determining data includes two determination values, or an engagement determination value and a disengagement determination value for determining whether the clutch is engaged or disengaged. A hysteresis exists between these two values. That is, the connection determining data has three regions, which are an engagement region, a partial engagement region, and a disengagement region, which are divided by the engagement determination value and the disengagement determination value. The partial engagement region is included in the engagement region when the ON operation of the inching pedal 33 is performed (the depressed amount being increased), and is included in the disengagement region when the OFF operation of the inching pedal 33 is performed (the depressed amount being decreased).

Hereafter, the process executed by the CPU 54 at step S21 of the mode switching process shown in FIG. 9 will be described.

At step S21 of the mode switching process shown in FIG. 9, the CPU 54 receives detection signals from the clutch pressure sensors 80, 81, and obtains the clutch pressure of the pressure receiving chambers 42a, 43a. Subsequently, based on the obtained clutch pressure and the information of the depressed amount of the inching pedal 33, the CPU 54 determines whether the clutch is engaged or disengaged by referring to the connection determining data. In this embodiment, the CPU 54 receives a detection signal of the inching pedal position sensor 82 at every predetermined control cycle. The CPU 54 compares the detection result (the depressed amount of the inching pedal 33) obtained in the current control cycle with the detection result obtained in the previous control cycle, and determines whether the OFF operation of the ON operation of the inching pedal 33 is performed based on the comparison result. When determining that the clutch is engaged based on the clutch pressure and the operation state of the inching pedal 33, the CPU 54 determines that the outcome of step S21 is positive. When determining that the clutch is disengaged, the CPU 54 determines that the decision outcome of step S21 is negative. That is, when the ON operation of the inching pedal 33 is being performed, the CPU 54 determines that the clutch is disengaged if the clutch pressure is equal to or less than the disengagement determination value. When the OFF operation of the inching pedal 33 is being performed, the CPU 54 determines that the clutch is engaged if the clutch pressure is equal to or less than the engagement determination value.

Therefore, in addition to the advantages (1) to (5) of the first embodiment, the third embodiment provides the following advantages.

(7) Whether the driving state is the driving force disconnection state is detected in accordance with the clutch pressure (hydraulic pressure) in the pressure receiving chambers 42a, 43a of the clutch (the advancing clutch 42 and the reversing clutch 43). If the detection is performed based on the operation state of the brake pedal 34, the detection result depends on the assembly accuracy of a detection section (for example, the brake switch 72) for detecting the operation state. Therefore, in this embodiment, the clutch pressures in the pressure receiving chambers 42a, 43a are directly detected to improve the detection accuracy and the determination accuracy, and whether the driving state is the driving force disconnection state is determined. Thus, the detection accuracy is improved so that the state in which the transmission of the driving force to the drive wheels 14 is disconnected is reliably detected. If the clutch is determined to be disengaged in the control procedure even if the clutch is actually not disengaged, the cancellation of the limitation on the driving at the time of shifting to the loading priority mode is likely to cause the forklift 10 to start abruptly.

Third Embodiment

A sixth embodiment of the present invention will now be described with reference to FIGS. 3 and 8. This embodiment may be applied to the first and second embodiments.

In this embodiment, when the load state is changed while the forklift 10 is traveling, and the contents of limitation on the vehicle driving (the maximum vehicle speed value and the acceleration/deceleration value) are changed depending on the change of the load state, a control for suppressing a sudden change in the vehicle speed (acceleration and deceleration) is executed (hereafter, referred to as normalizing control). Changes in the load state include a case where the fork height is changed from a low fork height to a high fork height or from a high fork height to a low fork height, and a case where the tilt angle is changed from the rearward tilt range to the outside of the range or from the outside of the range into the range. In this embodiment, the CPU 57 of the engine control apparatus 53 executes the normalizing control. Such a sudden change in the vehicle speed occurs frequently when the forklift 10 is traveling with the accelerator pedal 32 fully depressed. For example, when the limitation state, in which the driving of the vehicle is limited, is shifted to the non-limitation state, in which no limitation is imposed, the forklift 10 is likely to be suddenly accelerated and become unstable since the limitation on the maximum vehicle speed or the acceleration/deceleration is cancelled. In contrast, when the non-limitation state is shifted to the limitation state, the forklift 10 is likely to be suddenly decelerated and become unstable since the limitation on the maximum vehicle speed or the acceleration/ deceleration is imposed. When the contents of limitation are relaxed, the forklift 10 is likely to be suddenly accelerated and become unstable since the limitation on the maximum vehicle speed and the acceleration/deceleration is relaxed (that is, the maximum vehicle speed value is increased).

Hereafter, the contents of the normalizing control executed by the CPU 57 of the engine control apparatus 53 in this embodiment will be described. In this embodiment, the CPU 54 of the vehicle control apparatus 52 executes the limitation determining process shown in FIG. 7 as in the first embodiment.

The CPU 57 of the engine control apparatus 53 stores in the memory 58 the contents of limitation (the maximum vehicle speed value and the acceleration/deceleration value), which are instructed by limitation signals from the CPU 54 of the vehicle control apparatus 52. At this time, the CPU 57 stores in the memory 58 the contents of limitation instructed by limitation signals received in the previous control cycle and the contents of limitation instructed by limitation signals received in the current control cycle. The CPU 57 compares the contents of limitation of the previous control cycle stored in the memory 58 with the contents of limitation of the current control cycle, and determines whether there have been changes in the contents. Specifically, the CPU 57 determines whether the contents of limitation have been changed in response to a change in the fork height, and whether the contents of limitation have been changed in response to a change in the tilt angle. Changes in the contents of limitation in response to a change in the fork height include a change from the non-limitation state to the limitation state (hereafter, referred to as change patter P1) and a change from the limitation state to the non-limitation state (hereafter, referred to as change patter P2). Changes in the contents of limitation in response to a change in the tilt angle include changes in the maximum vehicle speed value and the acceleration/deceleration value in response to a change in the tilt angle from the rearward tilt range to the outside (hereafter, referred to as change patter P3), and changes the maximum vehicle speed value and the acceleration/deceleration value in response to a change in the tilt angle from the outside of the rearward tilt range into the rearward tilting range (hereafter, referred to as change patter P4).

Then, if there have no change in the contents of limitation on the vehicle driving, the CPU 57 adjusts the engine speed according to the contents of limitation of the current control cycle, thereby controlling the engine 16. Specifically, when the driving of the vehicle is not limited, the CPU 57 controls the throttle actuator 35 according to a detection signal (the amount of depression of the accelerator pedal 32) of the accelerator pedal position sensor 70 provided at the accelerator pedal 32, thereby adjusting the engine speed. When the driving of the vehicle is limited, the CPU 57 adjusts the engine speed using the engine speed adjustment data shown in FIG. 9 based on the maximum vehicle speed value and the acceleration/deceleration value stored in the memory 58.

On the other hand, when the contents of limitation on the driving of the vehicle have been changed, the CPU 57 determines which one of the change patterns P1 to P4 the change corresponds to. Then, the CPU 57 adjusts the engine speed according to a predetermined control set for each change pattern, thereby controlling the engine 16. If the change corresponds to the change pattern P1, the CPU 57 uses the maximum vehicle speed value instructed by the limitation signal as the maximum vehicle speed value, and the acceleration/deceleration level 1 as the acceleration/deceleration value instead of the acceleration/deceleration value (acceleration/deceleration level) instructed by the limitation signal. For example, even if the limitation signal instructs the maximum vehicle speed value of 15 km/h and the acceleration/deceleration level 4, the CPU 57 performs control using the acceleration/deceleration level 1. If the change corresponds to the change pattern P2, the CPU 57 cancels the limitation on the maximum vehicle speed value (does not limit the maximum vehicle speed value), while continuing to use the acceleration/deceleration level 1 as the acceleration/deceleration value.

If the change corresponds to the change patter P3, the CPU 57 performs control using the maximum vehicle speed value and the acceleration/deceleration value that are instructed by the limitation signal. If the change corresponds to the change pattern P4, the CPU 57 uses the maximum vehicle speed value instructed by the limitation signal as the maximum vehicle speed value, and the acceleration/deceleration level that is one degree lower than the acceleration/deceleration value (acceleration/deceleration level) instructed by the limitation signal. For example, in the case where the contents of limitation of the previous control cycle are the maximum vehicle speed value of 12 km/h and the acceleration/deceleration level 3, if the contents of limitation of the current control cycle are the maximum vehicle speed value of 15 km/h and the acceleration/deceleration level 4, the CPU 57 uses the maximum vehicle speed value of 15 km/h and the acceleration/deceleration level 3.

When limiting the acceleration/deceleration level according to the normalizing control as described above (when the acceleration/deceleration level has been changed), the CPU 57 sets the acceleration/deceleration level to a normal level according to the operation state of the accelerator pedal 32. That is, the CPU 57 monitors whether the ON operation of the accelerator pedal 32 is shifted to the OFF operation. When detecting that the ON operation of the accelerator pedal 32 has been shifted to the OFF operation, the CPU 57 restores the acceleration/deceleration level to the previous level. More specifically, if the change corresponds to the change pattern P1, the CPU 57 restores the acceleration/deceleration value corresponding to the acceleration/deceleration level 1 to the acceleration/deceleration value (the acceleration/deceleration level) instructed by the limitation signal. When the change corresponds to the change pattern P2, the CPU 57 cancels the setting of the acceleration/deceleration level, and does not limit the acceleration/deceleration. When the change corresponds to the change pattern P3, since the CPU 57 has not changed the acceleration/deceleration level, the CPU 57 maintains the current state. If the change corresponds to the change pattern P4, the CPU 57 restores the acceleration/deceleration value to the acceleration/deceleration value (the acceleration/deceleration level) instructed by the limitation signal.

Therefore, in addition to the advantages (1) to (6) of the first embodiment, the this embodiment provides the following advantages.

(8) When the contents of the limitation on the driving of the vehicle are changed, the acceleration/deceleration level is selected in accordance with the degree of the change, and the driving is controlled, accordingly. Therefore, when the contents of limitation are changed, the vehicle speed is prevented from being abruptly changed. That is, when the contents of limitation are changed, the forklift 10 is slowly accelerated or decelerated. As a result, the driving of the forklift 10 is prevented from being unstable when the contents of limitation are changed. That is, the forklift 10 is permitted to be driven in a stable manner. By executing the normalizing control of this embodiment, the stability of the forklift 10 is ensured both when the forklift 10 is traveling. Further, while the forklift 10 is traveling, the stability of the forklift 10 is ensured, which stability would not be achieved by simply controlling the maximum vehicle speed and the acceleration/deceleration. When the driving condition of the forklift 10 is changed, the driver is given a sufficient time for calmly dealing with such a change.

(9) In the normalizing control, when the driver performs the OFF operation of the accelerator pedal 32, the acceleration/deceleration level is restored to the normal level (the acceleration/deceleration level that corresponds to the load state). Thus, without complicating the operation of the driver, the limitation on the forklift 10 (the setting of the acceleration/deceleration level) is cancelled by the normalizing control.

The above illustrated embodiment may be modified as follows.

In the illustrated embodiments, the parameters used in the determination whether the maximum vehicle speed and the acceleration/deceleration should be limited, and the computation of the maximum vehicle speed and the acceleration/deceleration may be changed. For example, the maps may be configured for performing the determination based on the fork height and the load weight, and for computing the maximum vehicle speed value and the acceleration/deceleration value. In the necessity determining data shown in FIG. 4, the regions of the fork height and load weight may be segmented into smaller regions to provide two or more limitation regions. In this case, the vehicle speed computation data shown in FIG. 5 and the acceleration/deceleration computation data shown in FIG. 6 are provided for each of the limitation regions, so that data for computing the maximum vehicle speed value and the acceleration/deceleration value is changed for each limitation region. When segmenting the regions of the fork height, the mast assembly 19 may be provided with two or more limit switches for detecting the fork height. Alternatively, the mast assembly 19 may be provided with a reel sensor for continuously detecting the fork height.

Although the illustrated embodiments are applied to a torque converter type forklift 10 (torque converter vehicle), the present invention may applied to clutch type forklift (clutch vehicle) or Hydrostatic Transmission vehicles (HST vehicle).

In the illustrated embodiments, it may be configured that the advancing electromagnetic valve 44 and the reversing electromagnetic valve 45 are fully closed when the current to the solenoids is zero, and are fully open when a current is supplied to the solenoids.

In the illustrated embodiments, the advancing relay circuit 60 and the reversing relay circuit 61 may be formed by normally-open contacts instead of normally-closed contacts. In the case where normally-open contacts are used, the advancing electromagnetic valve 44 and the reversing electromagnetic valve 45 are energized when the normally-open contacts are closed, and de-energized when the contacts are open.

In the illustrated embodiments, the structures of the advancing clutch 42 and the reversing clutch 43 may be changed. That is, it may be configured that an increase in the clutch pressure of each pressure receiving chamber 42a, 43a increases the engaging force, and a decrease in the clutch pressure reduces the engaging force.

In the illustrated embodiments, when limiting the acceleration/deceleration, the CPU 54 of the vehicle control apparatus 52 may send a signal indicating the acceleration/deceleration level to the engine control apparatus 53 instead of the limited acceleration/deceleration value.

In the illustrated embodiments, whether the driving of the vehicle needs to be limited is determined based on the load state. However, for example, a setting device (an instruction sectoin) operable by the driver may be provided in the cab 13, and the limitation on the driving of the vehicle may be instructed by using the setting device. Also, the contents of the limitation such as the maximum vehicle speed value may be instructed through the manipulation of the setting device by the driver. The setting device is connected to the vehicle control apparatus 52.

In the illustrated embodiments, the limitation canceling conditions may be changed to any of the following first to fourth patterns. According to the first pattern, the limitation condition is met when the driving state is the driving force disconnection state. According to the second pattern, the limitation condition is met when the driving state is the driving force disconnection state and the vehicle speed is equal to or less than the limitation canceling vehicle speed. The limitation canceling vehicle speed may be a value obtained by subtracting a fixed value from the maximum vehicle speed value as in the illustrated embodiments, or a predetermined vehicle speed value (for example, 6 km/h). According to the third pattern, the limitation condition is met when the driving state is the driving force disconnection state and the OFF operation of the accelerator pedal 32 is performed. According to the fourth pattern, the limitation condition is met when the driving state is the driving force disconnection state, the vehicle speed is equal to or less than a predetermined vehicle speed value, and the OFF operation of the accelerator pedal 32 is performed.

In the first and third embodiments, whether the driving state is the driving force disconnection state may be detected (determined) based on an operation of the advance/reverse lever 31 or the inching pedal 33. When the detection is executed based on an operation of the advance/reverse lever 31, the driving force disconnection state is detected when the lever 31 is in the neutral position [N]. When the detection is executed based on an operation of the inching pedal 33, the driving force disconnection state is detected when the ON operation of the inching pedal 33 is being performed (when the inching pedal 33 is being operated). In the illustrated embodiments, the detection is executed based on an operation of the brake pedal 34. However, the detection may be executed based on the operation of the combination of the brake pedal 34 and the advance/reverse lever 31, or the combination of the inching pedal 33 and the advance/reverse lever 31. For example, the driving force disconnection state may be detected when the advance/reverse lever 31 is in the neutral position [N] and the ON operation of the inching pedal 33 is being performed.

In the illustrated embodiments, the condition for returning to the loading priority mode may be changed when shifting from the loading priority mode to the limited driving mode. For example, when detecting the driving force disconnection state based on the operation state of the inching pedal, the mode may be returned to the loading priority mode when a returning condition is met that the inching pedal 33 is pressed after being released (OFF operation to ON operation) and the limitation canceling condition is met. In this case, the returning condition may include the OFF operation of the accelerator pedal 32. As another modification, when detecting the driving force disconnection state based on the fact that the advancing/reversing lever 31 is in the neutral position, the mode may be returned to the loading priority mode when a returning condition is met that the OFF operation of the accelerator pedal 32 is performed and the limitation canceling condition is met.

In the illustrated embodiments, the shift switch 69 may be configured to detect that the advance/reverse lever 31 is in the neutral position [N]. That is, the advance/reverse lever 31 may be provided with a section (sensors and switches) that detects the advancing position [F], the reverse position [R], and the neutral position [N].

In the illustrated embodiments, the contents of the limitations on the vehicle driving may be only the limitation of the maximum vehicle speed. That is, the acceleration/deceleration value may be constant.

In the first embodiment, the map data for adjusting the engine speed (the engine speed adjustment data) is stored in the memory 58. However, instead of referring to the map data, the CPU 57 may calculate the adjustment amount of the engine speed using a predetermined arithmetic expression based on information sent to the CPU 57 (the maximum vehicle speed value, the acceleration/deceleration value, and the vehicle speed).

In the first and third embodiments, the depressed amount (pedal stroke amount) of the inching pedal 33 may be detected, and the engagement or disengagement of the clutch may be detected based on the detection result.

In the third embodiment, the acceleration/deceleration level that is selected when the contents of limitation are changed may be changed. That is, to avoid sudden acceleration or deceleration, an acceleration/deceleration level that reduces the acceleration/deceleration compared to the normal level is selected.

The sixth embodiment may be configured that the CPU 54 of the vehicle control apparatus 52 determines whether the contents of limitation have been changed, and that, in accordance with the determination result, the CPU 54 instructs the maximum vehicle speed value and the acceleration/deceleration value to the CPU 57 of the engine control apparatus 53. The CPU 57 performs control according to the instruction.

The invention claimed is:

1. A drive control apparatus for a forklift, wherein the forklift includes a vehicle, a drive wheel provided to the vehicle, an engine, a power transmission mechanism capable of transmitting power of the engine to the drive wheel, a loading device that is provided at a front portion of the vehicle and mounts a load, and a loading pump that supplies hydraulic oil to actuate the loading device, wherein the forklift uses the power of the engine as a driving force for driving the vehicle and as a loading force for actuating the loading pump, the drive control apparatus comprising:

a disconnection detection section that detects whether the power transmission mechanism is in a disconnection state, in which the driving force is not transmitted to the drive wheel, wherein, when at least the disconnection detection section detects the disconnection state, a limitation canceling condition is met;

an acceleration operation section that instructs acceleration of the vehicle in response to an operation by a driver;

a limitation determining section, wherein the limitation determining section determines whether to limit a maximum vehicle speed during driving of the vehicle based on a determination of a load state or an input from an instruction section that instructs driving limitation, and when the result of the determination is positive, the limitation determining section determines a speed limit; and a control section that adjusts a speed of the engine based on the amount of operation of the acceleration operation section, and controls the driving of the vehicle;

wherein, when the determination result of the limitation determining section during the driving of the vehicle is negative, the control section adjusts the engine speed in accordance with the operation amount of the acceleration operation section without limiting the vehicle speed, wherein, when the determination result of the limitation determining section during the traveling of the vehicle is positive, the control section limits the vehicle speed and adjusts the engine speed such that the vehicle speed does not exceed the speed limit, and wherein, if the limitation canceling condition is met while the vehicle speed is limited, the control section cancels the vehicle speed limitation state, and executes a loading priority control in which the actuation of the loading device is prioritized, and wherein, in the loading priority control, the control section adjusts the engine speed in accordance with the operation amount of the acceleration operation section.

2. The drive control apparatus according to claim 1, wherein the limitation canceling condition further includes a state where the vehicle speed is equal to or lower than a predetermined limitation canceling vehicle speed.

3. The drive control apparatus according to claim 1, wherein the limitation canceling condition further includes a non-operated state of the acceleration operation section.

4. The drive control apparatus according to claim 1, wherein, when the vehicle speed surpasses the speed limit while the load priority control is executed, the control section terminates the load priority control, thereby returning to the vehicle speed limitation state.

5. The drive control apparatus according to claim 4, wherein, when terminating the load priority control and resuming the vehicle speed limitation state, the control section returns to the load priority control when a predetermined returning condition is met, and wherein the returning condition includes a non-operated state of the acceleration operation section.

6. The drive control apparatus according to claim 1, wherein the power transmission mechanism includes a hydraulic clutch having a pressure receiving chamber, the clutch is continuously changed between engagement and disengagement in accordance with a hydraulic pressure in the pressure receiving chamber, wherein the clutch is provided with a hydraulic pressure detecting section for detecting the hydraulic pressure in the pressure receiving chamber, and wherein the disconnection detection section detects whether the power transmission mechanism is in the disconnection state based on the hydraulic pressure detected by the hydraulic pressure detecting section.

* * * * *